(No Model.) 2 Sheets—Sheet 1
H. W. WEISS.
MILK COOLER AND HEATER.
No. 280,695. Patented July 3, 1883.
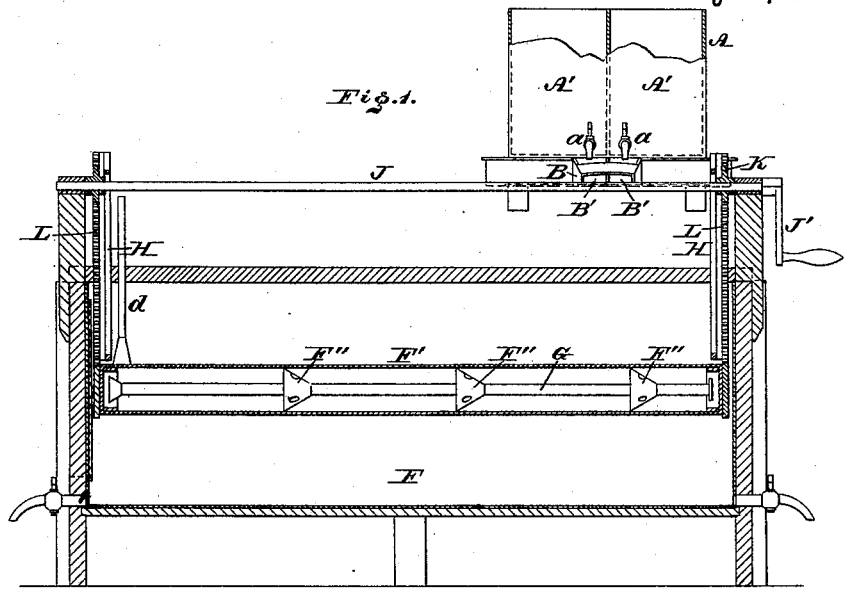
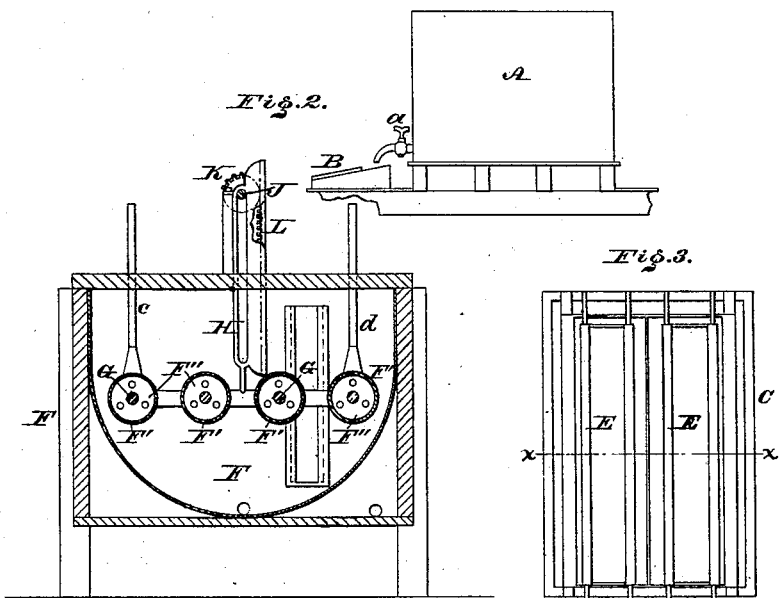
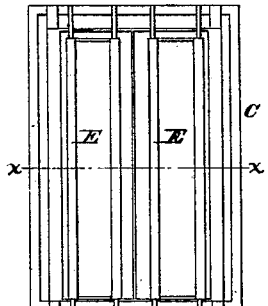
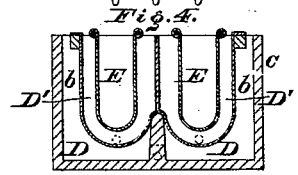
WITNESSES:
L. Douville
W. F. Kircher
INVENTOR:
Henry W. Weiss
BY Jean A. Wiedersheim
ATTORNEY.

(No Model.) 2 Sheets—Sheet 2.
H. W. WEISS.
MILK COOLER AND HEATER.
No. 280,695. Patented July 3, 1883.
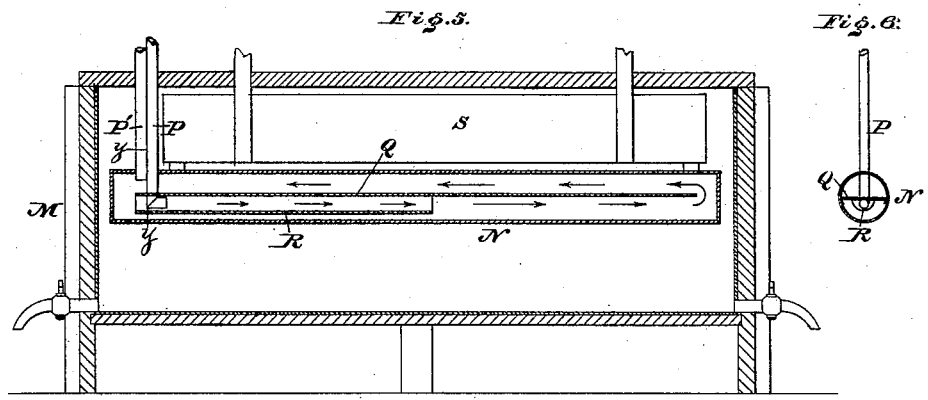
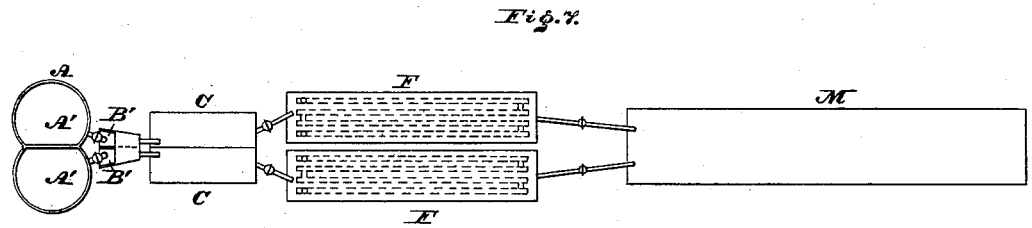
WITNESSES:
L. Douville
W. F. Kircher
INVENTOR:
Henry W. Weiss
BY John A. Wiedersheim
ATTORNEY.

UNITED STATES PATENT OFFICE.

HENRY W. WEISS, OF QUAKERTOWN, PENNSYLVANIA.

MILK COOLER AND HEATER.

SPECIFICATION forming part of Letters Patent No. 280,695, dated July 3, 1883.

Application filed March 30, 1882. (No model.)

*To all whom it may concern:*

Be it known that I, HENRY W. WEISS, a citizen of the United States, residing at Quakertown, in the county of Bucks, State of Pennsylvania, have invented a new and useful Improvement in Milk Coolers and Heaters, which improvement is fully set forth in the following specification and accompanying drawings, in which—

Figure 1 is a longitudinal vertical section of the milk-cooling apparatus embodying my invention. Fig. 2 is a transverse vertical section thereof. Fig. 3 is a top view of the refrigerator primarily used. Fig. 4 is a vertical section thereof in line $x\ x$. Fig. 5 is a longitudinal vertical section of the milk-heating apparatus. Fig. 6 is a vertical section of a portion in line $y\ y$, Fig. 5. Fig. 7 is a top view, showing the system of cooling and heating milk.

Similar letters of reference indicate corresponding parts in the several figures.

My invention consists of a divisional conveyer, or funnel therefor, a primary refrigerator, a novel cooling device, means for raising the cooling device, a breaker for the water in the cooling-pipes, and heating appliances, all as will be hereinafter fully set forth.

Referring to the drawings, A represents a receiving-tank, which has a central vertical partition, thus forming two compartments, A', each having its own faucet $a$; and B represents a funnel, which has a central vertical partition, thus forming two channels, B', one for each of the faucets $a$.

The object of forming the receiving-tank A into two compartments is to separate the morning and evening milk, whereby I am enabled to procure pure and rich cream and deprive the milk of all the cream it contains, which cannot be done when the two kinds of milk are mixed.

The tank A is placed on a scale, so that when milk is received in either compartment of the tank it may be weighed in order to indicate the quantity delivered and used.

C represents a refrigerator for primarily cooling the milk and depriving it of its animal heat, said refrigerator being formed of a tank, D, within which is a false bottom, forming a chamber, D', leaving a space, $b$, between the tank and false bottom for cold water or other cooling medium. Suspended from the top of the tank are ice-holders E, which dip into the chamber D', the latter forming a receptacle for the milk which flows from the tank A.

In practice I employ two refrigerators, C, and the funnel B is so disposed in relation to the tank A and said refrigerators that when the faucets $a$ are turned the morning and evening milk will flow through the respective channels of the funnel B, and so reach the proper refrigerator, thus preserving the separation of the two kinds of milk. As the milk in the chambers D' is subjected both to the cooling action of water in the tank D and the ice in the holders E, it is quickly deprived of its animal heat, the cooling-surface being sufficiently great to produce said result as the milk flows through the refrigerators.

The chambers D' are provided with faucets or cocks for removing the cooled milk therefrom, and the holders E are made removable, so as to be conveniently replenished with ice and cleansed, and permit free access to the chambers for cleaning and other purposes.

F represents cooling-vats, to which the milk primarily cooled is next directed, the faucets of the chambers D' leading to said vats, said vats having suspended within them a series of horizontal pipes, F', which are properly connected and communicate alternately at opposite ends, one of the pipes being provided with a supply-pipe, $c$, and the pipe on the opposite side having a discharge-pipe, $d$. By this provision cold water is admitted into the pipe $c$, and directed through the several pipes F', and discharged through the pipe $d$, or may be permitted to remain in the pipes F' until replenished with fresh cold water.

Within the pipes F' is a series of water-breakers, F''', fitted to a supporting-rod, G, and of conical form, and perforated at the apex, or between the apex and base, the bases facing the inlet end of the pipes F'. When the water enters the pipes, it fills the same to the first breaker, then enters said breaker and escapes through the perforations into the space beyond the breaker and reaches the next breaker, and is thus directed from circumference to center and center to circumference, and thereby broken or separated, so that fresh cool particles of water are brought against the pipes, the water thus changing in its contact with the surface of the pipes. The ends of the pipes F' are detachable, thus permitting the breakers to be inserted and removed, the rod G serving to sustain the breakers in the pipes, and also acting as a handle when removal is necessary for repairs, cleansing, &c.

It is evident that the primarily-cooled milk in the vat F will be cooled by the greater action of the pipes F', and thus thoroughly chilled or cooled, whereby the cream is raised in a rapid manner and in increased quantities. The pipes F' are connected to upright arms H, which are of the form of loops, the top of each of which depends from a shaft, J, mounted on standards rising from the vats F, said shaft having a suitable crank or operating-handle, J'.

To the shaft are secured pinions K, which mesh with racks L on the arms H. By rotating the shaft J the pinions K and racks L cause first the elevation of the pipes F', and next the change of direction of the pipes from a horizontal to perpendicular, the pipes then being adapted to be drawn out and rested on the top of the vat, so that the interior of the latter is freely accessible for cleansing and other purposes. I continue the practice of separating the morning and evening milk, and so employ two cooling-vats, F.

If desired, the space between the inner and outer bottoms of the vats may be filled with a cooling medium, and the vats are closed by suitable lids, for evident purposes.

By the operations heretofore stated the cream has been quickly raised, and in quantities the utmost contained in the milk. After removing the cream the remaining milk need no longer be separated, and it may now be run into the heating-vat for the manufacture of cheese. The heating-vat I employ is shown in Figs. 5 and 6.

M represents a tank or vat, within which is suspended one or more partitioned heating-pipes, N. Entering the pipe N is a smaller pipe, P, for directing steam or hot water to said pipe N, said pipe passing to near the center of the pipe N, below the horizontal partition Q in the latter.

Enveloping the discharge-nozzle of the pipe P is a guard or semi-cylindrical pipe, R, which extends beneath the partition Q, and is secured thereto, both ends of said guard being open, and the partition Q being shorter than the pipe N, so as to form communications at the ends of said pipe above and below the partition. When steam or hot water is admitted to the pipe N through the pipe P, there is a circulation of hot water in said pipe N, whereby the pipe is kept in a highly-heated condition, the overflow or exhaust occurring through the pipe P'. The guard R prevents injurious action of the steam in the pipe N at the place of admission by the pipe P, where too great heat imparted to said pipe N would burn or scorch the curd in the tank M, this being avoided by said guard R acting as a deflector.

The heating-pipe is properly oscillated, and has connected to it a flat plate, S, arranged upright, which serves to agitate the milk. When the curd has formed, the heating device is withdrawn by means of block and tackle or other hoisting apparatus, and the curd allowed to set and then cut or broken.

Having thus described my invention, what I claim as new, and desire to secure by Letters Patent, is—

1. The milk-receiving tank having a vertical partition forming two compartments, A' A', each having a faucet, a, a funnel having a vertical partition forming two channels, B' B', the double primary refrigerator C, and the double cooling-vats F, combined and operating substantially as and for the purpose set forth.

2. The milk-cooling pipe F', having a series of breakers, F'', and a supporting-rod, G, therefor, substantially as and for the purpose set forth.

3. The milk-cooling pipe F', in combination with the looped arms H, rack L, pinion K, and rotary shaft J, substantially as and for the purpose set forth.

4. The pipe N, having within it a horizontal partition, Q, an open-ended guard, R, secured to said partition, and separated by a space or interval from the bottom of pipe N, and a pipe, P, which passes below said partition and opens into said guard, substantially as and for the purpose set forth.

The above specification of my invention signed by me this 29th day of October, A. D. 1881.

HENRY W. WEISS.

Witnesses:
JOHN A. WIEDERSHEIM,
A. P. GRANT.